United States Patent [19]

Noack et al.

[11] 4,149,858
[45] Apr. 17, 1979

[54] METHOD AND APPARATUS FOR THE SEPARATION OF SULFUR & NITROGEN OXIDES FROM A WASTE GAS

[75] Inventors: Rolf Noack; Horst Lichtenberger; Stefan Gramelt, all of Oberhausen; Harald Juntgen, Essen; Karl Knoblauch, Essen; Horst Grochowski, Oberhausen; Jürgen Schwarte, Essen, all of Fed. Rep. of Germany

[73] Assignees: Deutsche Babcock AG, Oberhausen; Bergwerksvergand GmbH, Essen, both of Fed. Rep. of Germany

[21] Appl. No.: 803,595

[22] Filed: Jun. 6, 1977

[30] Foreign Application Priority Data

Jun. 16, 1976 [DE] Fed. Rep. of Germany ....... 2626939

[51] Int. Cl.² ............................................. B01D 19/00
[52] U.S. Cl. .......................................... 55/73; 55/79; 55/99; 55/479; 55/390
[58] Field of Search ............................. 55/73, 77–79, 55/98, 99, 390, 474, 479

[56] References Cited

U.S. PATENT DOCUMENTS

| 3,717,976 | 2/1973 | Gappa et al. | 55/73 |
| 4,004,350 | 1/1977 | Squires | 55/98 |
| 4,033,117 | 7/1977 | Smith | 55/99 |

FOREIGN PATENT DOCUMENTS

| 2239827 | 2/1974 | Fed. Rep. of Germany | 55/479 |
| 216675 | 6/1924 | United Kingdom | 55/474 |

*Primary Examiner*—Bernard Nozick
*Attorney, Agent, or Firm*—Parmelee, Johnson, Bollinger, & Bramblett

[57] ABSTRACT

A method and apparatus for separating undesirable components from a waste gas by adsorption of the components onto a granular adsorbent. The gas is caused to flow serially through two distinct side-by-side layers of adsorbent both moving parallel to one another in a direction perpendicular to the direction of gas flow. The adsorbent material is so controlled that the particles of the second layer to be contacted by the gas are less loaded with impurities than the particles of the first layer. In one embodiment, this result is achieved by moving the second layer faster than the first layer.

2 Claims, 6 Drawing Figures

4,149,858

METHOD AND APPARATUS FOR THE SEPARATION OF SULFUR & NITROGEN OXIDES FROM A WASTE GAS

BACKGROUND OF THE INVENTION

1. Field of the Invention

This invention relates to the separation of undesirable gaseous components from a waste gas. More particularly, this invention relates to apparatus and methods wherein granular adsorbent material, such as activated coke or activated charcoal, is caused to flow through a waste gas, in a direction transverse to the direction of gas flow, to adsorb the undesirable components of the gas. The invention has particular utility in separating out sulfur dioxide and nitric oxides from the waste gas from electric power stations.

2. Description of the Prior Art

Gas purification apparatus has been provided wherein granular adsorbent material is supported as a fluidized bed which flows downwardly through a horizontally-flowing stream of gas containing undesirable components to be removed from the gas. In such an installation, the adsorbent at the top is relatively fresh, while the adsorbent nearer the bottom is increasingly loaded with impurities. This has presented a problem, because the gas in the top portions of the horizontally moving gas stream is effectively purified, while the gas in the portions nearer the bottom of the stream may be insufficiently purified. One solution that has been proposed to this problem is to direct the lower portions of the gas exiting from the adsorber into a second adsorber. However, this solution is unsatisfactory because it increases both the construction costs and the quantity of adsorber required.

It also has been proposed to divide the flowing stream of gas unevenly in such a manner as to direct a proportionately greater quantity of the gas into the upper part of the downwardly-moving fluidized bed than into the lower part thereof. Such an arrangement however alters the rate of gas through-flow, resulting in pressure losses with adverse effects on the separation action. It also is known to increase the fluidizing speed at the gas entrance to the adsorber, such that the dust held at the entrance side by the adsorbent is more rapidly transported off so as to counter the effect of an increase in the pressure loss.

SUMMARY OF THE INVENTION

In preferred embodiments of the invention to be described hereinbelow in detail, adsorbent material is disposed in two downwardly-flowing fluidized beds closely adjacent and parallel to one another, i.e. in two vertical side-by-side layers, and the waste gas is directed horizontally through both layers, serially. In accordance with an important aspect of the invention, the adsorbent in the second fluidized bed layer to be contacted by the gas, i.e. the layer at the output side of the gas flow path, is controlled to be less loaded with impurities than is the adsorbent of the first layer to be contacted by the gas. In this way, waste gas near the exit of the adsorber has unloaded adsorbent material in its path, so as to assure effective purification of the gas before it reaches the exit.

One way of providing unloaded adsorbent in the second layer is to cause it to flow downward at a higher velocity than the adsorbent in the first layer, sufficiently rapidly to assure that regions adjacent the gas output side receive fresh adsorbent in sufficient quantity to perform effective purification. The adsorbent drawn off at the bottom of the first layer does not contain substantial amounts of unloaded particles, and is therefore efficiently utilized.

Advantageously, the adsorbent drawn off at the bottom of the second layer is recycled, as by being introduced into the top of the adsorber together with fresh, i.e. regenerated adsorbent. Thus, adsorbent from the second layer which is only partially loaded is not subjected to an unnecessary desorption treatment. By recycling this partly-loaded adsorbent into the inlet of the first layer of adsorbent, the waste gas that contacts such adsorbent is in effect subjected to a pre-purification phase which, due to the partial loading of the particles, does not cause unacceptable heating which can occur where raw (unpurified) waste gas first meets fresh adsorbent.

Accordingly, it is an object of the invention to provide superior apparatus and methods for separating undesirable gaseous components from a waste gas. Other objects, aspects and advantages of the invention will in part be pointed out in, and in part apparent from, the following detailed description, considered together with the accompanying drawings.

DESCRIPTION OF PREFERRED EMBODIMENTS

Figure 1:
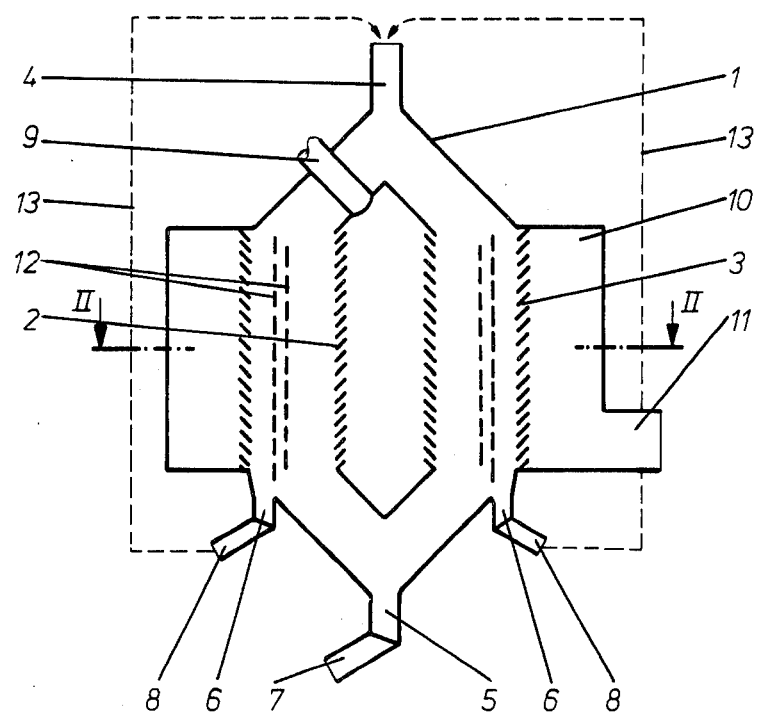
FIG. 1 shows in diagrammatic format an adsorber constructed in accordance with the present invention.
Figure 2:
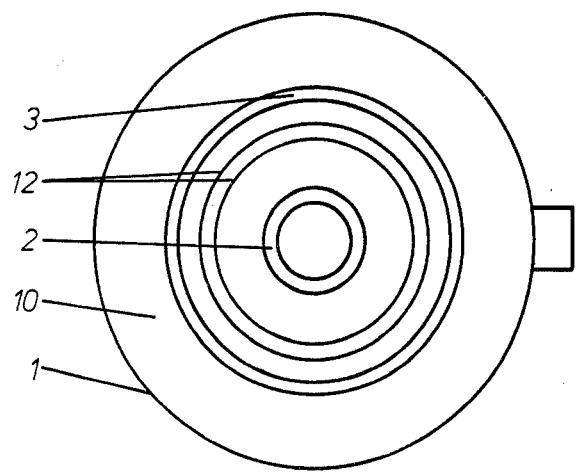
FIG. 2 is a horizontal section taken along line II—II of FIG. 1.

Referring now to FIG. 1, the adsorber comprises a housing 1 generally of cylindrical configuration, i.e. having a circular cross-section. Within this housing are two concentrically-arranged, annular walls 2 and 3 formed of gas-permeable louvres. The space between these two walls is filled with adsorbent material consisting of activated coke or activated charcoal formed as a fluidized bed. This adsorbent enters the apparatus through a filler comprising an inlet aperture 4 at the top of the housing. It flows downwardly through the space between the walls 2, 3 and is drawn off, as by means of suction, through a set of outlets comprising apertures 5, 6. Within these outlet apertures may be placed known withdrawal controls such as those referred to as vibro channels or cell wheel drains which regulate the rate of adsorbent withdrawal.

The waste gas that is to be purified, e.g. the flue gas of a power station, enters the adsorber through an input pipe 9 leading to the spaces within the inner gas-permeable wall 2. From there, the gas flows radially outwards through the adsorbent material to be purified thereby. After passing through the outer gas-permeable wall 3, the waste gas reaches a collector 10 in the form of a chamber which surrounds the outer wall 3. The gas is directed from that collector through an output nozzle 11 to a chimney (not shown).

The adsorbent drawn off through the center outlet 5 is regenerated, as by means of heat. To provide good utilization of the adsorbent material, its through-put speed at the center outlet 5 is regulated such that the adsorbent discharged therethrough is nearly fully loaded with impurities. This practically fully-loaded adsorbent contacts some of the unpurified flue gas, and its purification power is very low.

To avoid this disadvantage, without at the same time increasing the construction costs greatly, the fluidized bed of adsorbent is divided into two vertically-extending concentric layers or channels, one at the entry side of the waste gas, adjacent the inner gas-permeable wall 2, and the other at the exit side of the gas, adjacent the outer gas-permeable wall 3. The through-put speed of each of these channels is regulated by adjusting the speeds of adsorbent withdrawal at the respective outlets 5 and 6. These speeds are set to provide that the adsorbent from the center outlet 5 is fully loaded with impurities, while the adsorbent withdrawn from the peripheral outlets 6 is only partly loaded. To achieve this objective, the speeds are adjusted so that the outer fluidized bed layer moves faster than the fluidized bed layer at the inflow side.

Advantageously, the internal structure is so arranged that mixing of the two side-by-side layers is prevented. For this purpose, separating elements 12 are provided consisting of annular-shaped pieces of sheet iron extending in the direction of movement of the adsorbent. Preferably, the partly-loaded adsorbent from the outer outlet 6 is recycled, as indicated by lines 13, to the inlet aperture 4 where it is combined with regenerated (fresh) adsorbent.

Figure 3:
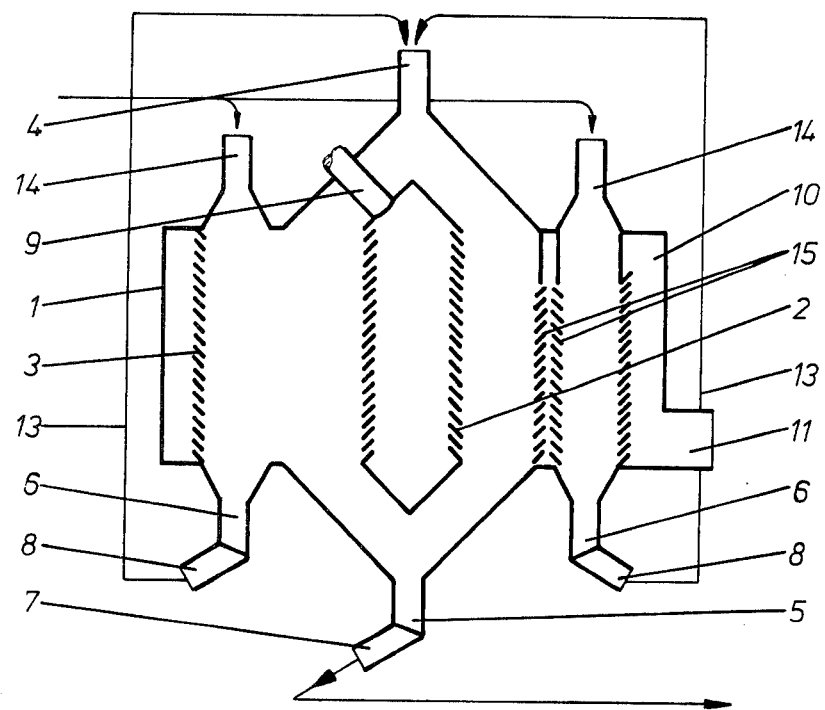
FIGS. 3 through 6 show other embodiments of the invention.

Referring now to FIG. 3, in another embodiment of the invention the adsorbent layer at the exit side of the adsorber is provided with a separate inlet aperture 14 through which only unloaded (regenerated) adsorbent is fed. As in the FIG. 1 embodiment, the center inlet aperture 4 receives both regenerated adsorbent and partly-loaded adsorbent. With this arrangement, the adsorbent may be withdrawn from the two outlets 5, 6 at equal speeds while nevertheless maintaining the withdrawn outer layer adsorbent partly-unloaded and the withdrawn inner layer adsorbent fully-loaded.

No separation elements are shown at the left-hand portion of the FIG. 3 embodiment since the provision of individual inlet and outlet apertures for each layer tends to maintain the desired separation. However, more definite division of the two layers can be achieved if desired, as by the use of separating elements 15 shown at the right in FIG. 3. Here the separating elements comprise two parallel permeable walls formed of louvres having a space therebetween through which the gas passes but which is free of adsorbent granules.

Figure 4:
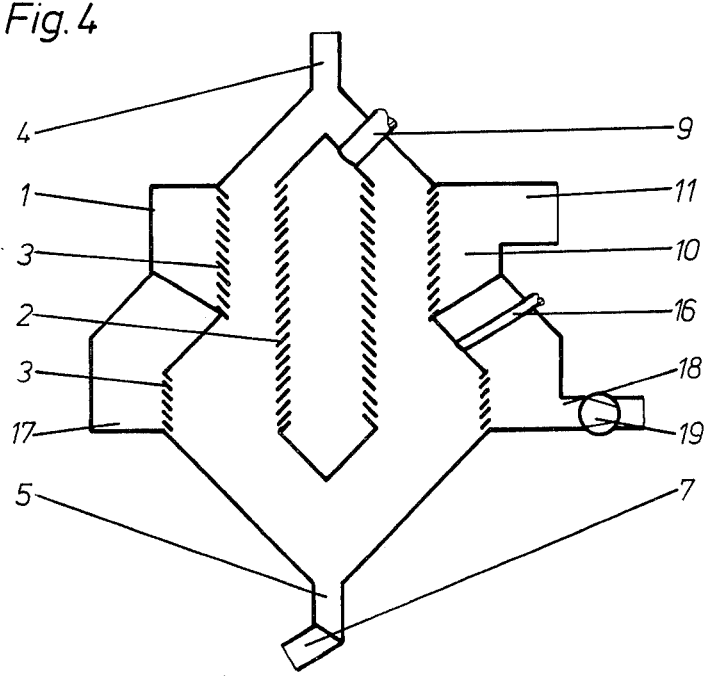

Referring now to FIG. 4, in another embodiment of the invention the radial dimension between the gas-permeable walls 2 and 3 is relatively increased in a lower section of the housing 1. Two separate layers of adsorbent are established only in this enlarged region. The outer layer is supplied with fresh adsorbent through a feed pipe 16 adjacent the gas-permeable wall 3.

Figure 5:
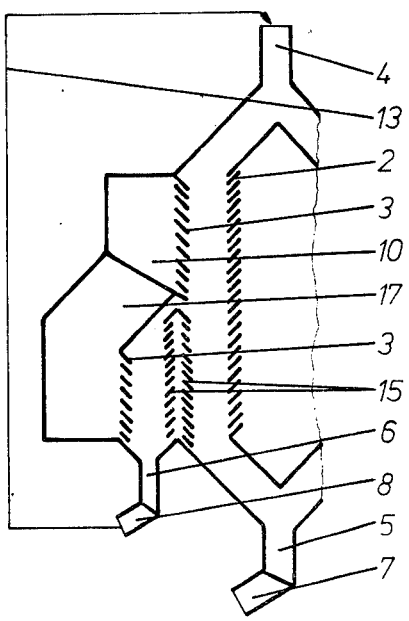
Figure 6:
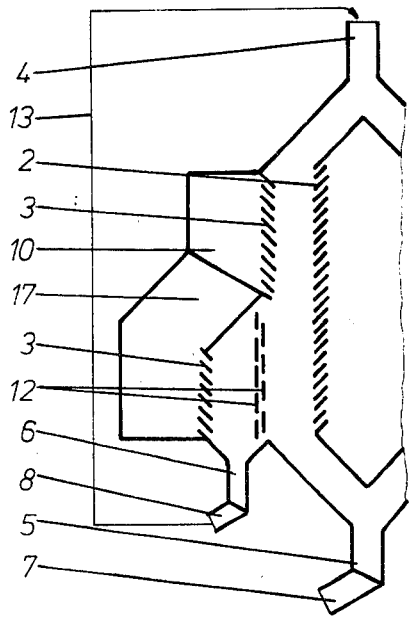

FIG. 5 shows internal details of a portion of the adsorber of FIG. 4, illustrating louvre walls 15 to effect separation of the two layers in the lower, enlarged section of the structure. Alternatively, as shown in FIG. 6, separators 12 of sheet iron may be provided for this purpose. In either configuration, there is provided around the enlarged section of the structure an additional waste gas collector 17 separate from the waste gas collector 10 in the upper section. The additional collector receives only gas which has passed through the second layer of adsorbent, outwards of the separator 15, while the upper collector 10 receives waste gas which has passed only the first layer of adsorbent. To equalize the difference in pressure, a blower 19 is provided in the outlet nozzle 18 of the waste gas collector 17.

Although preferred embodiments of the invention have been described herein in detail, it is desired to emphasize that this is for the purpose of illustrating the principles of the invention, and should not necessarily be construed as limiting of the invention since it is apparent that those skilled in this art can make many modified arrangements of the invention without departing from the true scope thereof.

We claim:

1. A method for the separation of undesirable components from a waste gas, such as sulfur dioxide and nitric oxides from the waste gas of power stations, through adsorption of the gas on a granular adsorbent such as activated carbon or activated coke, and wherein the adsorbent material flows in an adsorber structure from the top to the bottom thereof while the waste gas to be purified flows through the adsorber in a transverse direction, said method comprising:

flowing the adsorbent material in two distinct layers moving parallel to and closely adjacent each other;

flowing the waste gas serially through said two layers;

controlling said adsorbent material so that the first layer thereof contacted by said waste gas is more saturated with impurities than is the second layer contacted by said waste gas;

supplying said second layer with fresh adsorbent material; and recycling the adsorbent material drawn off from said second layer back into the flowing adsorbent material of said first layer free from processing to remove impurities.

2. The method of claim 1, wherein the output adsorbent from said second layer is recycled to said first layer without introducing any such output adsorbent from said second layer into the input of said first layer.

* * * * *